United States Patent
Vray et al.

(10) Patent No.: US 8,608,660 B2
(45) Date of Patent: Dec. 17, 2013

(54) METHOD OF TRACING THE LIKELY CONTOUR OF AN ANATOMICAL ELEMENT ON AN IMAGE OF A CROSS SECTION

(75) Inventors: Didier Vray, Ternay (FR); Thierry Pechoux, Paris (FR)

(73) Assignees: Theraclion, Villeurbanne (FR); Centre National de la Recherche Scientifique, Paris (FR); Institut National des Sciences Appliquees de Lyon, Paris (FR)

( * ) Notice: Subject to any disclaimer, the term of this patent is extended or adjusted under 35 U.S.C. 154(b) by 63 days.

(21) Appl. No.: 13/002,452

(22) PCT Filed: Jul. 3, 2009

(86) PCT No.: PCT/FR2009/051305
§ 371 (c)(1),
(2), (4) Date: Jan. 3, 2011

(87) PCT Pub. No.: WO2010/001067
PCT Pub. Date: Jan. 7, 2010

(65) Prior Publication Data
US 2011/0105899 A1  May 5, 2011

(30) Foreign Application Priority Data

Jul. 4, 2008 (FR) ................................. 08 54572

(51) Int. Cl.
*A61B 8/00* (2006.01)
(52) U.S. Cl.
USPC .......................................... 600/437; 600/407

(58) Field of Classification Search
USPC ............................................................ 600/437
See application file for complete search history.

(56) References Cited

U.S. PATENT DOCUMENTS

| 5,072,384 A | 12/1991 | Doi et al. |
| 5,734,739 A | 3/1998 | Sheehan et al. |
| 2002/0193685 A1* | 12/2002 | Mate et al. .................. 600/424 |
| 2005/0096528 A1 | 5/2005 | Fritz et al. |

OTHER PUBLICATIONS

International Search Report (Form PCT/ISA/210) for International Application No. PCT/FR2009/051305 dated Dec. 1, 2009.
G. Pelle, et al., "Microcomputer-based system for automatic analysis of M-mode echocardiograms," Journal of Biomedical Engineering, Jul. 1, 1993, pp. 274-278, vol. 15, No. 4.

(Continued)

*Primary Examiner* — Unsu Jung
*Assistant Examiner* — Saurel J Selkin
(74) *Attorney, Agent, or Firm* — Sughrue Mion, PLLC (57) ABSTRACT

A method of tracing the likely contour of an anatomical element in a sectional image of an anatomical site, the image being composed of pixels having different intensities, the method including the steps of: a) forming columns of pixels passing through the anatomical element; b) assigning each pixel a pixel score representing the probability of the pixel being situated on the contour of the anatomical element; c) constituting a matrix of pixel scores from a plurality of columns of pixels and defining numerous continuous paths of pixels, each passing through a single pixel of each column; d) assigning each continuous path a path score that is a function of the scores of the pixels constituting the continuous path; e) selecting from a set of continuous paths the path that has the best path score, that path representing the likely contour of the anatomical element.

11 Claims, 6 Drawing Sheets

(56) References Cited

OTHER PUBLICATIONS

Wen-Nung Lie, et al., "A robust dynamic programming algorithm to extract skyline in images for navigation," Pattern Recognition Letters, Jan. 15, 2005, pp. 221-230, vol. 26, No. 2.

Robert M. Haralick, et al., "Context Dependent Edge Detection," Proceedings of the Conference on Computer Vision and Pattern Recognition, Jun. 5-9, 1988, pp. 223-228.

* cited by examiner

METHOD OF TRACING THE LIKELY CONTOUR OF AN ANATOMICAL ELEMENT ON AN IMAGE OF A CROSS SECTION

This application is a National Stage of International Application No. PCT/FR2009/051305 filed Jul. 3, 2009, which claims priority from French Patent Application No. 0854572 filed Jul. 4, 2008, the contents of all of which are incorporated herein by reference in their entirety.

The present invention relates to a method of tracing the likely contour of an anatomical element on a sectional image of an anatomical site. The image may be an echographic image, for example, made up of pixels having different intensities. The anatomical element is represented by pixels of substantially identical characteristic intensity and bordered by pixels of significantly different intensity so that the anatomical element is identified visually in the sectional image without it being possible to define its contour precisely. The present invention also relates to a method of monitoring movement of a target to be treated that may use the method of the invention for tracing its likely contour. The present invention further relates to a therapeutic treatment device including means for tracking the movement of an anatomical marker visible on a sectional image. The present invention finds an especially useful application in the medical field and more particularly in the field of medical treatment using sectional images, which images may be obtained using well-known techniques such as echography, MRI, etc.

In the field of therapeutic treatment, it is generally necessary to have a perfect knowledge of the anatomical site where a target to be treated is located. In addition to this target to be treated, the anatomical site may include other anatomical elements that it is necessary to identify and to locate for various reasons.

Sectional images, such as echographic images, for example, are images of relatively low resolution. Such an image cannot show the precise contour or limits of anatomical elements visible in the sectional image. Thus the contour of the anatomical element often takes the form of an area of irregular and varying thickness. This obviously results from numerous kinds of interference that degrade the quality of the sectional image. An echographic image is affected by numerous unwanted echoes that are nevertheless represented visually in the sectional image.

A first object of the present invention is to overcome this drawback linked to the imprecise representation of the contours of anatomical elements by defining a method of tracing the likely contour of an anatomical element on the sectional image. Another object of the present invention is to use the sectional image, and more particularly one or more anatomical elements visible in the sectional image, to monitor movement of the target to be treated. The monitoring method may in particular use the tracing method of the invention to trace clearly and visibly the contour of the anatomical element that is to be used as an anatomical marker in the sectional image. In the therapeutic treatment of the thyroid, for example, it is useful to detect thyroid movements that may result from the patient swallowing or moving the head.

A further object of the present invention is the use of this method of monitoring movement of the target to be treated in a therapeutic treatment device.

To achieve the above objectives, the present invention provides a method of tracing the likely contour of an anatomical element in a sectional image of an anatomical site, the image being composed of pixels ($P_i$) having different intensities, the contour of the anatomical element being represented by pixels of substantially identical characteristic intensity and bordered by pixels of substantially different intensities so as to identify the anatomical element visually in the sectional image without it being possible to define its contour precisely, the method comprising the following steps: a) forming columns (K) of pixels ($P_i$) passing through the anatomical element; b) assigning each pixel ($P_i$) a pixel score representing the probability of the pixel being situated on the contour of the anatomical element; c) constituting a matrix of pixel scores from a plurality of columns (K) of pixels and defining numerous continuous paths of pixels, each passing through a single pixel of each column; d) assigning each continuous path a path score that is a function of the scores of the pixels constituting the continuous path; e) selecting from a set of continuous paths the path that has the best path score, that path representing the likely contour of the anatomical element; and optionally (f) displaying the likely contour on the sectional image by superposing it on the anatomical element. Thus the source used by the tracing method of the invention is the sectional image representing the anatomical element of contour that is to be determined and the method processes this image so as to be able to reconstitute the likely contour of the anatomical element, which may then be displayed on the sectional image superimposed on the anatomical element. By using the tracing method sequentially or continuously, the likely contour may be displayed permanently on the sectional image representing the anatomical element so that the likely contour automatically tracks the anatomical element if it moves in the sectional image. In this way, the contour of the anatomical element can be shown very clearly, even if it is deformed or moves. Alternatively, situations may be envisaged in which the contour could be calculated and the curve obtained and then used, for example, to resynchronize images without displaying them.

The novelty of the method lies in considering continuous paths of pixels (one per column) and assigning each path a score that is directly or indirectly related to the scores of each pixel of the path concerned. The score of the continuous path may be equal to or proportional to the sum of the scores of the pixels constituting the path.

The step b) advantageously comprises the step of establishing an intensity differential for each pixel between an averaged upper band ($B_s$) of pixels and an averaged lower band ($B_i$) of pixels situated on either side of the pixel ($P_i$) concerned, this differential representing the pixel score.

The step c) preferably further comprises the following steps:
 c1) identifying the pixel ($P_x$) in the column (K) that has the maximum score;
 c2) forming continuous segments of pixels ($P_x$);
 c3) identifying the longest continuous segment, this segment having a central pixel ($P_{xs}$) that is definitely situated on the contour of the anatomical element;
 c4) restricting the set of continuous paths to paths passing through the central pixel ($P_{xs}$). Thus this step makes it possible to determine from the numerous pixels forming the sectional image and with virtually no risk of error the pixel that is definitely situated on the contour of the anatomical element, to consider the continuous paths of pixels passing through this "seed" pixel, and finally to select the continuous path having the best path score. In other words, the seed pixel may be predetermined to restrict the continuous paths of pixels to only those passing through the seed pixel.

The method advantageously further comprises, after the step e), a step of smoothing the continuous path representing the likely contour. This smoothing step may also be obtained by the following filtering steps:

e1) if the continuous path from the step c) is not periodic, rendering it periodic to obtain a periodic curve;

e2) filtering the periodic curve to smooth it, retaining only the first harmonics of the Fourier series;

e3) extracting the smoothed continuous likely contour from the smoothed curve.

The steps d) and e) are advantageously executed simultaneously using a dynamic programming technique.

Using pixel columns in step a) is particularly appropriate for tracing the likely contour of a linear anatomical element, such as the skin, for example. In the sectional image the representation of the skin extends from one side to the other of the image forming a segment of a curve that consequently has a beginning and an end. However, some anatomical elements have a closed or looped configuration such that there is no beginning and no end. In this situation, direct use of pixel columns is not appropriate, because each column intersects the contour of the anatomical element at least twice. This is not possible with the tracing method of the invention. To be able nevertheless to use the tracing method of the invention in the situation of an anatomical element having a looped contour, the invention provides for the step a) to include a preliminary step consisting in a1) tracing radii from a point situated inside the closed loop, each radius crossing the contour of the anatomical element once, and a2) arranging the radii parallel and side by side to form columns of pixels. In this way, the configuration is the same as for a linear anatomical element such as the skin. The tracing method may then be applied to these radii disposed in the form of the columns of pixels of the step a).

The principle of this tracing method is thus to define precisely the contour of an anatomical element that is represented crudely or imprecisely in a sectional image. The precise definition of this contour makes it possible to display very clearly the contour of the anatomical element and to track it in the sectional image as it is moved or deformed.

The present invention also provides a method of monitoring movement of a target to be treated, notably by ultrasound, during its treatment, on the basis of a sectional image of an anatomical site representing the target, the method comprising the following steps: choosing at least one anatomical marker visible on the image, tracing the contour of the anatomical marker on the image, capturing a reference image before the treatment begins, for example, and comparing the images with the reference image during treatment to detect unexpected movement of the contour of the target. This monitoring method uses an anatomical element visible in the image as an anatomical marker the contour of which is traced on the image. It is then easy to detect movement of the contour of the anatomical marker from a reference image. Once again, as in the tracing method, an anatomical element visible in the sectional image is used to trace its contour on the image.

The method advantageously includes suspending the treatment of the target if unexpected movement of the contour of the anatomical marker is detected from a reference image. The method advantageously includes adjusting the treatment parameters as a function of the position of the marker. The step of tracing the contour preferably uses the tracing method defined above.

The invention further provides the use of the method of monitoring movement of a target to be treated, in thyroid treatment, taking as an anatomical marker the skin and/or the carotid artery.

The present invention further provides a therapeutic treatment device comprising therapeutic treatment means for treating a target, imaging means providing sectional images of an anatomical site comprising the target to be treated, and means for tracking movement of at least one anatomical marker visible in the sectional images;

the device being characterized in that the tracking means comprise means for tracing the contour of the anatomical marker on the sectional images to detect unexpected movement of the contour during treatment. Thus the device uses the monitoring method defined above. The device advantageously further includes means for suspending the treatment that are activated if the unexpected movement exceeds a predetermined limit. The tracing means preferably include software for executing the tracing method defined above.

A principle common to the tracing method, the monitoring method, and the treatment device is that a sectional image is used in which an anatomical element is identified of contour that is traced directly on the sectional image.

One embodiment of the invention is described in more detail below by way of non-limiting example and with reference to the appended drawings.

To illustrate the present invention, therapeutic treatment of the thyroid is referred to. Of course, the present invention may be applied to any type of target to be treated, for example the prostate gland.

Figure 1:
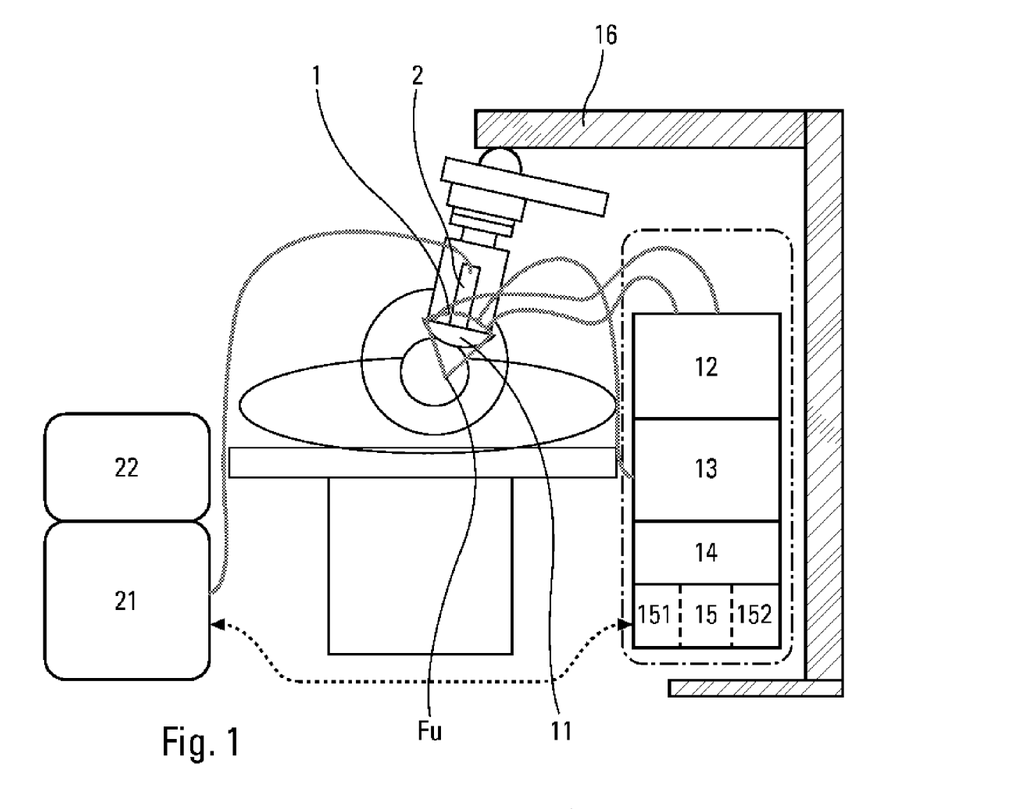
FIG. 1 is a general view of a therapeutic treatment device of the invention.

The components of the therapeutic treatment device of the invention are described in detail first with reference to FIG. 1.

Figure 2:
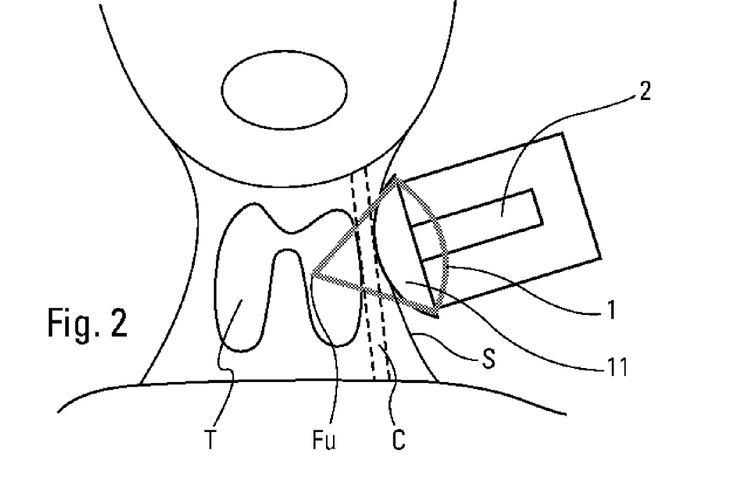
FIG. 2 is a diagram showing part of the FIG. 1 treatment device placed on a patient in order to treat the thyroid.

The device comprises firstly an acoustic emission source 1 that may advantageously be an ultrasound transducer adapted to produce an ultrasound beam Fu. The ultrasound transducer is preferably of the HIFU focused type for producing an ultrasound beam focused at a precise focal point. The transducer may equally well be of the strip transducer type. As seen in FIG. 2, the transducer 1 may comprise a chamber that is filled with a coupling fluid through which the ultrasound beam propagates. For example, this chamber may be defined by a flexible balloon designed to come into intimate contact with an external surface S of an area of a body in which a target T to be treated is situated. The external surface S is generally the skin of the patient. Circulation means 12 are generally provided for circulating the coupling fluid inside the chamber 11 and enabling the flowrate and the temperature of the coupling fluid inside the chamber 11 to be controlled. The transducer obviously requires a power supply 13 to operate and a movement controller 14 that makes it possible to move the transducer and to locate it precisely relative to the patient. To this end, the transducer 1 is preferably mounted on an articulated arm 16. Finally, the transducer is coupled to a computer 15 for managing all the parameters of the transducer, such as its power, frequency, pulse duration, etc.

The treatment device of the invention also comprises imaging means, for example in the form of an echographic probe 2 coupled to an echograph 21 and a display screen 22 that displays sectional views or images of the anatomical site over which the probe 2 travels. As may be seen in FIGS. 1 and 2, the probe 2 is mechanically coupled to the transducer 1. To be more precise, the probe 2 and the transducer 1 are fastened together so that the probe 2 tracks the focal point of the ultrasound beam Fu. The area of maximum intensity of the ultrasound beam Fu is always represented on the image on the screen 22. To this end the echograph 21 may be coupled to the computer 15 of the transducer, as shown in FIG. 1. MRI or RX imaging or a scanner may be used instead of echographic imaging.

Figure 3:
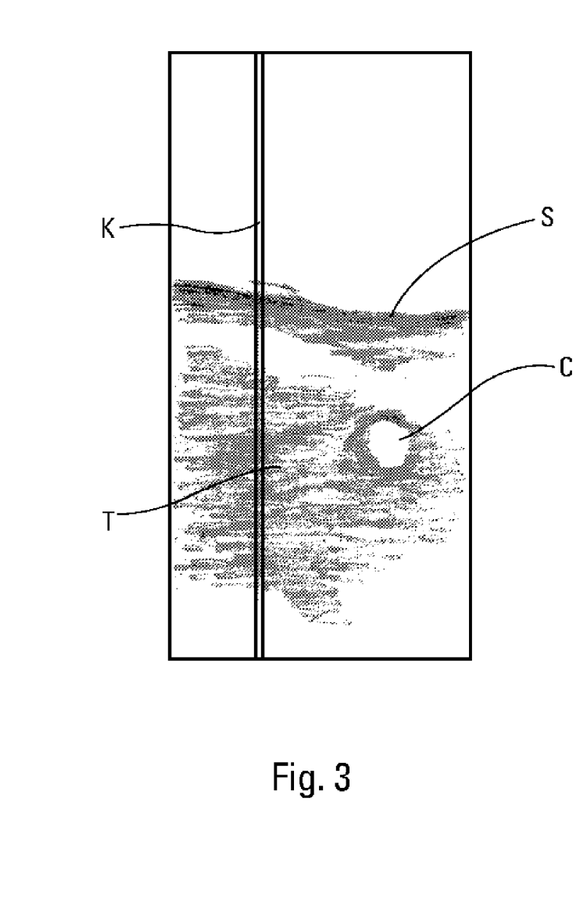
FIG. 3 is a diagrammatic sectional image of the FIG. 2 anatomical site, namely the neck of the patient, representing the skin S, the carotid artery C, and the thyroid T, which is the target to be treated.

The therapeutic treatment device of the invention also comprises means 151 for tracking the movement of at least one anatomical marker visible in sectional images displayed on the display screen 22. For treatment of the thyroid, as here, the sectional image, such as that visible in FIG. 3, shows the skin S and the carotid artery C of the patient as well as the thyroid T to be treated. According to the invention, the skin S and/or the carotid artery C are anatomical elements that may be used as anatomical markers for tracking movement in the image. The skin S and the carotid artery C are particular anatomical elements in the sense that they may be identified in the sectional image even though it is not possible to define their contour precisely. In other words, the contours of the skin S and the carotid artery C are perceptible on the image, but only in a blurred or barely discernable manner. It might be possible to trace their contour on the sectional image manually, but it would then not be certain that the contour as traced really followed the actual contour. During the explanation of the tracing method of the invention given below it is described how the likely contour of these anatomical elements or anatomical markers may be traced precisely. Be this as it may, the means for tracking movement of the skin S and/or the carotid artery C may take the form of software integrated into the computer 15. The tracking means 151 are shown very diagrammatically in FIG. 1. According to the invention, these tracking means comprise means for tracing the contour of the anatomical marker or element, here the skin S and/or the carotid artery C, on the sectional image to detect any unexpected movement of the contour of the marker during the treatment. To be more precise, the contour of the skin S and/or the carotid artery C is traced on the sectional image displayed on the display screen 22 at the place where the real contour is most likely to be located. If the probe 2 is moved over the anatomical site, the skin S and/or the carotid artery C move in the sectional image and the tracking means 151 make it possible to establish a new trace of the contour of the skin S and/or the carotid artery C that is again superimposed on the real contour. In other words, the trace of the contour of the skin S and/or the carotid artery C tracks the movement of the anatomical marker or element S and/or C in the sectional image. If the movement of the contour of the anatomical marker in question is intentional or reflects normal treatment conditions, the transducer 1 continues to treat the target, namely the thyroid T. In contrast, if the movement of the contour of the anatomical marker is unexpected or reflects abnormal treatment conditions, the transducer 1 is stopped. To this end, the treatment device includes treatment suspension means 152 that may also be integrated into the computer 15. These treatment suspension means 152 are activated as soon as an unexpected movement exceeds a particular predetermined limit, for example. The object of the tracking means 151 is to prevent the transducer 1 from treating an area of the anatomical site that is not the target to be treated, with the risk of damaging this undoubtedly healthy area. If the transducer 1 is moved over the anatomical site in a predetermined or intended manner, i.e. under normal treatment conditions, the tracking means 151 detect normal movement of the contour of the skin and/or the carotid artery but the treatment suspension means remain inactive. In contrast, as soon as the transducer 1 is moved in an unpredictable or unexpected way, i.e. one no longer conforming to normal treatment conditions, the tracking means 151 detect the movement of the contour of the skin and/or the carotid artery and because this movement exceeds the predetermined limit the treatment suspension means are activated and the treatment by the transducer 1 is stopped or suspended temporarily. Before the treatment begins, the operator chooses an anatomical element or marker that is visible in the sectional image. The skin S and the carotid artery C are generally chosen, but one of them may suffice. The choice of the combined markers is advantageous because the skin S is relatively linear while the carotid artery C is somewhat annular. Taking them together, the marking is reliable and accurate. After choosing these markers, the operator traces the contours of the skin S and the carotid artery C directly on the sectional image displayed on the display screen 22 using the tracking means 151 and the tracing means integrated into the computer 15. A reference image is then captured showing the skin and the carotid artery with their superimposed contours traced on the screen. This may be seen in FIG. 12. The treatment may then be started, i.e. the transducer 1 may emit beams of ultrasound, preferably focused beams, in the direction of the target to be treated. During treatment, the tracking means 151 compare the sectional images of the anatomical site with the reference image captured before the treatment began to detect any unexpected movement of the contours of the skin and the carotid artery. The contours of the skin and the carotid artery are traced continuously as the image moves. They may be compared with the reference image captured before the start of the treatment or an image may be compared with the preceding image. If an unexpected movement is detected, the transducer 1 is stopped. An unexpected movement generally occurs if the patient moves, with the result that the target to be treated moves relative to the transducer 1. This occurs in particular in treatment of the thyroid if the patient gulps, swallows, or coughs. The patient may also turn their head, which has an effect on the neck and consequently on the thyroid. By means of tracking the movement of the contour of one or more anatomical markers or elements, it is possible to detect behaviors of the patient that could cause the transducer to target an area that is not the target to be treated.

In addition to this ability to detect inappropriate behavior of the patient, the tracking means 151 make it possible to measure accurately the position of the skin relative to the transducer 1. It is therefore possible, as a function of the distance separating the transducer from the skin, to adjust the treatment parameters and in particular the intensity of the ultrasound beam as a function of the thickness of flesh or tissue that the beam must pass through to reach the target to be treated. Consequently, the tracking means 151 provide a very simple way of measuring the distance separating the skin from the transducer or the thickness of the tissue to be passed through.

As explained above, the therapeutic treatment device and the monitoring method of the invention employ tracing the contour of an anatomical element or marker on the sectional image to detect unexpected movement of that anatomical element in the sectional image, such movements generally representing an inappropriate movement or behavior of the patient. To enable tracing of the contour of the anatomical element, the present invention also proposes a method of tracing the likely contour of the anatomical element on the sectional image. That tracing method is described below with reference to FIGS. 3 to 12 and uses as a starting point the sectional image produced by the echographic probe and displayed by the display means. Nevertheless, instead of using the probe, any other technique may be used that makes it possible to obtain a sectional image. FIG. 3 represents diagrammatically a sectional image such as might be observed on the display screen. However, FIG. 3 constitutes a negative of the sectional image such as might be observed on the display screen. On the screen, the light parts of FIG. 3 are represented in black while the more or less dark parts are represented with grey shades going up to white. This negative representation of the sectional image has been used for simplicity. There may be seen therein a white part at the top and a lower part comprising white areas and areas of greater or lesser darkness. The white upper part represents the propagation liquid inside the balloon. The balloon is in contact with the skin S and may sometimes be represented by a relatively dark line. The balloon is very often confused with the skin. As may be seen in FIG. 3, the skin S is not represented by a thin sharp line, but on the contrary by an area that is more or less well defined. It is thus difficult under these conditions to define accurately the contour of the skin S. Beneath the skin there may be seen the substantially circular carotid artery C. Again, its contour is difficult to define since it consists of a dark ring with irregular edges. To the left of the carotid artery C there may be discerned the thyroid T, which here constitutes the target to be treated. It might be possible to trace the likely contours of the skin S and the carotid artery C manually and directly on the sectional image. However, the tracing method of the invention uses a succession of complex steps to determine from the sectional image the likely contour of the skin S and/or the carotid artery C.

The sectional image consists of pixels having different intensities. Note in particular that the pixels representing the skin S and the carotid artery C have respective substantially identical characteristic intensities so as to form areas of substantially constant shade. Note in particular that the area above the skin S is totally white, like the area situated inside the contour of the carotid artery C. This being a sectional echographic image, the intensity of the pixels varies from white to black through shades of grey. It may nevertheless be imagined that the pixels are color pixels with varying shades. For simplicity, only pixels from black to white are considered here. Again, it must not be forgotten that the FIG. 3 representation is a negative representation, the white areas on the display screen being black in reality and the black areas being white in reality.

To begin, consideration is given first to the skin S. Tracing the contour of the carotid artery is covered subsequently. The first step of the method of the invention of tracing the likely contour of the skin consists in forming columns K of pixels $P_i$ passing through the skin S. The columns K are disposed vertically here, given that the skin S extends substantially horizontally from one side to the other of the display screen.

Figure 4:
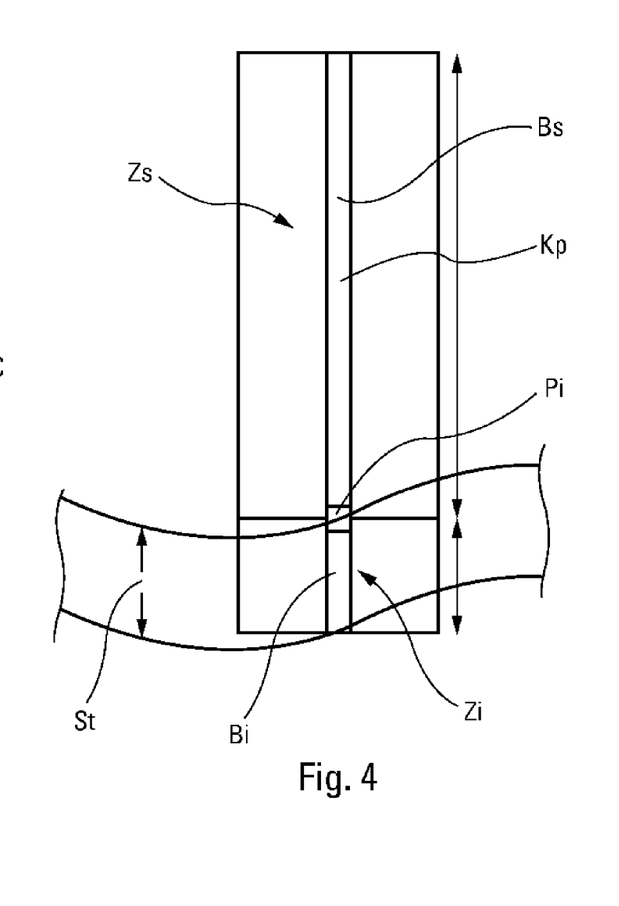
FIG. 4 is an illustrative diagram used to explain a step of the likely contour tracing method of the invention.
Figure 5:
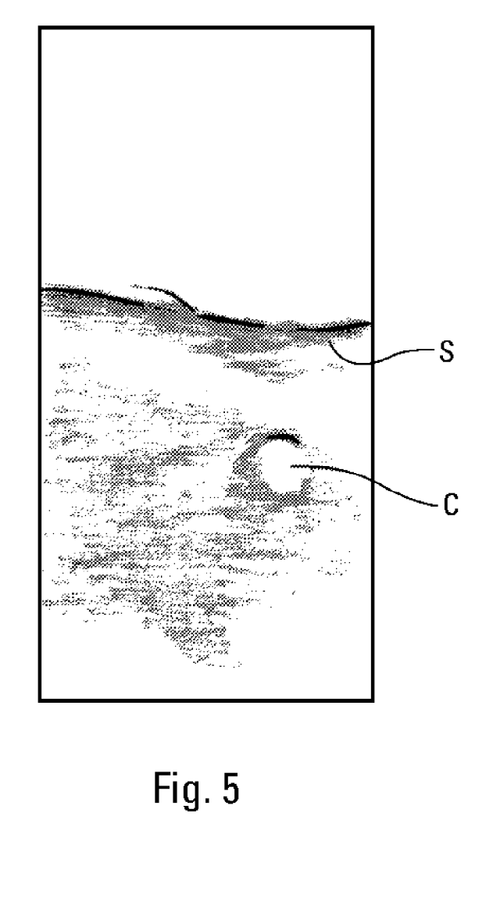
FIG. 5 is a diagram showing a sectional image similar to that of FIG. 3 and showing continuous path segments used in the likely contour tracing method of the invention.

The first step of the tracing method is explained with reference to FIG. 4. For each Pixel $P_i$ of each column K a value referred to as a score is calculated. To determine the score specific to each pixel $P_i$, a column section Kp is considered that is a defined number of pixels high. The pixel $P_i$ for which the score is to be calculated is always positioned at the same place in this column section Kp. For example the pixel $P_i$ may be positioned 10 or 11 pixels from the lower edge. This value of 10 or 11 pixels may be determined as a function of the estimated thickness $S_t$ of the skin as observed on the display screen. Thus in the column section Kp there is a band $B_i$ of about 10 pixels below the pixel $P_i$ for which the score is to be calculated and a band $B_s$ of approximately 40 pixels above it. The screen may thus be divided into two areas, a lower area Zi 10 or 11 pixels wide and an upper area Zs 40 pixels high. The average intensities of the column section Kp in the band $B_i$ and in the band $B_s$ are then calculated and the difference between these average intensities is established and yields a value that is assigned to the pixel $P_i$ as its score. This operation is thus effected for each pixel $P_i$ of the column K. To this end, the column section Kp is moved over the column K with a step of one pixel, for example from the top to the bottom of the screen. Clearly a pixel situated on the skin S will have a high score, given that the band $B_s$ situated above the pixel is completely clear, while the band $B_i$ situated below the pixel is very dark. The contrast is maximal, and so the difference should also be maximal. This pixel will thus have a particularly high score characteristic of its position on the contour of the skin. A score is established in this way for each pixel of all the columns K by sweeping the screen from left to right or from right to left. For each column K, it is then easy to determine the pixel that has the score most characteristic of the contour of the skin S. This highest scoring pixel is designated $P_x$. On either side of this pixel $P_x$ in the column K there are other pixels $P_i$ with good scores, but not as good as that of the pixel $P_x$.

The next step consists in forming continuous segments of paths of pixels $P_x$. It is not possible to form a continuous line of paths of pixels $P_x$ going from one side to the other of the screen, given that not all the pixels $P_x$ are contiguous. These continuous segments are represented in a highly diagrammatic and smoothed manner in FIG. 5. There may be observed therein four continuous segments of paths of pixels $P_x$ situated on the skin S and one contiguous segment situated on the contour of the carotid artery C. Of the five segments, the longest is identified. By eye, it is the segment situated the farthest to the left in FIG. 5. The pixel $P_x$ that is situated at the center of this longest segment is then selected, and is referred to as the seed pixel $P_{xs}$. This seed pixel $P_{xs}$ is entirely unique, given that it is definitely situated on the contour of the anatomical element, here the contour of the skin. Thus this second step b has made it possible to determine from columns K of pixels a seed pixel $P_{xs}$ that is definitely situated on the contour of the skin.

Figure 6:
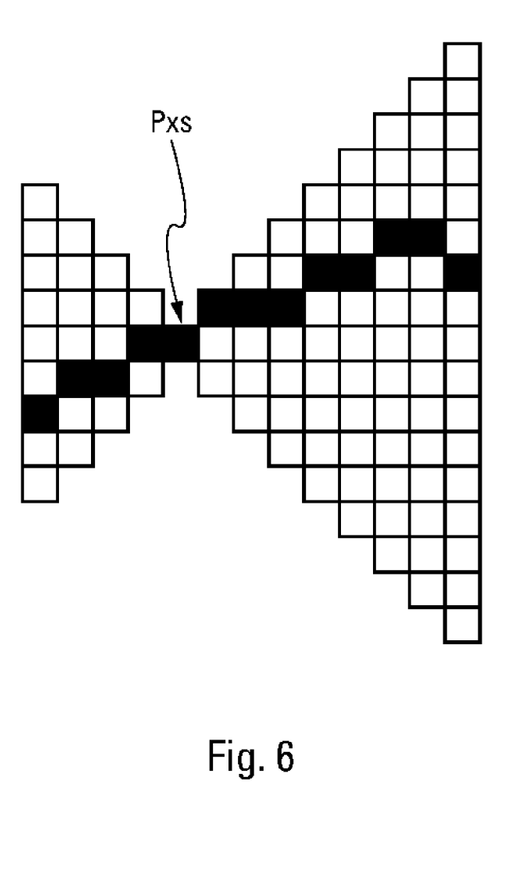
FIG. 6 is a diagram also used to explain the tracing method of the invention.
Figure 7:
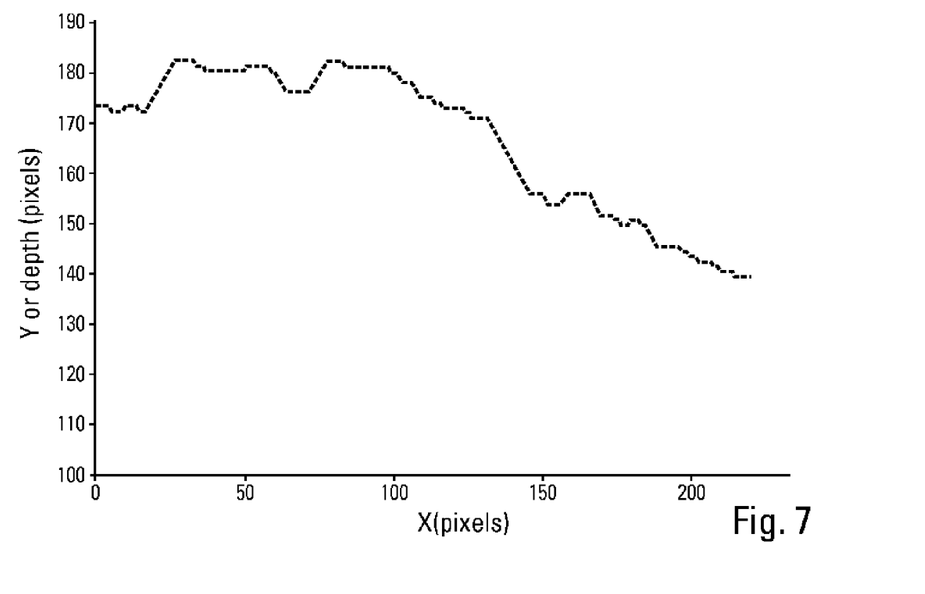
FIGS. 7 to 10 are graphs used to explain other steps of the tracing method of the invention.

The next step consists in forming or reconstituting a continuous path of pixels from the seed pixel $P_{xs}$ that passes through the pixels having the best possible score. To this end a technique known as "dynamic programming" may be used. FIG. 6 represents diagrammatically the use of this dynamic programming technique. Starting from the central or seed pixel $P_{xs}$, there are formed toward the right and toward the left, as far as the edge of the image, a plurality of continuous paths of pixels each having a path score. This path score is a function of the individual scores of the pixels constituting the path concerned. The function may be of any kind, for example the sum of the scores of the pixels of the path. Of these continuous paths, the one is selected that has the best path score. This path does not necessarily pass through all the pixels $P_x$, given that they are not all contiguous with the preceding or next pixel $P_x$. The dynamic programming technique selects from all the pixels the contiguous pixel that gives the best continuous path score. This dynamic programming technique is also used in computer spellcheckers, for example. If a word has been written incorrectly, the checker looks at all the letters to determine those that have the greatest possibility of completing a word close to that searched for. The continuous path of pixels obtained in this way is formed of pixels that are directly contiguous or contiguous only at their corner (the pixels are considered to be represented as squares having a shade from black to white). The curve obtained in this way is not smooth, whereas the skin is substantially smooth. A complete curve of the skin is represented in FIG. 7. There may be identified therein the pixels that are connected directly or by their corner. This curve is not at all smooth, however.

Searching beforehand for the seed pixel $P_{xs}$ is advantageous but is not essential. The highest scoring continuous path may very well be selected without aiming for it necessarily to pass through the seed pixel. Nevertheless, making passage through the seed pixel essential enables a significant saving in calculation time.

Figure 8:
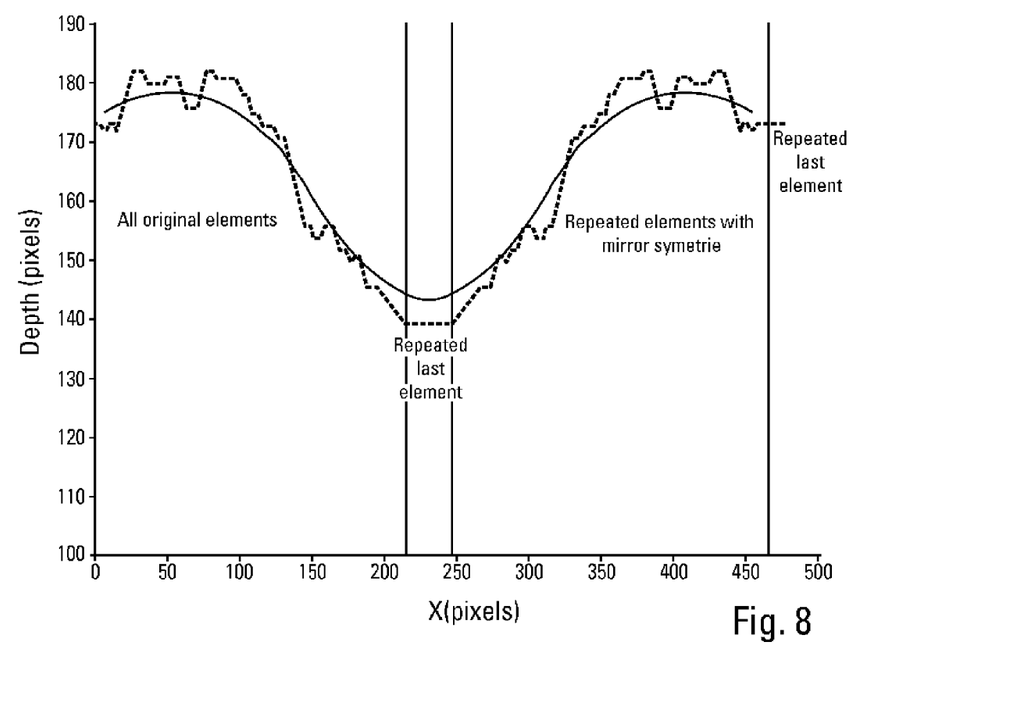
Figure 9:
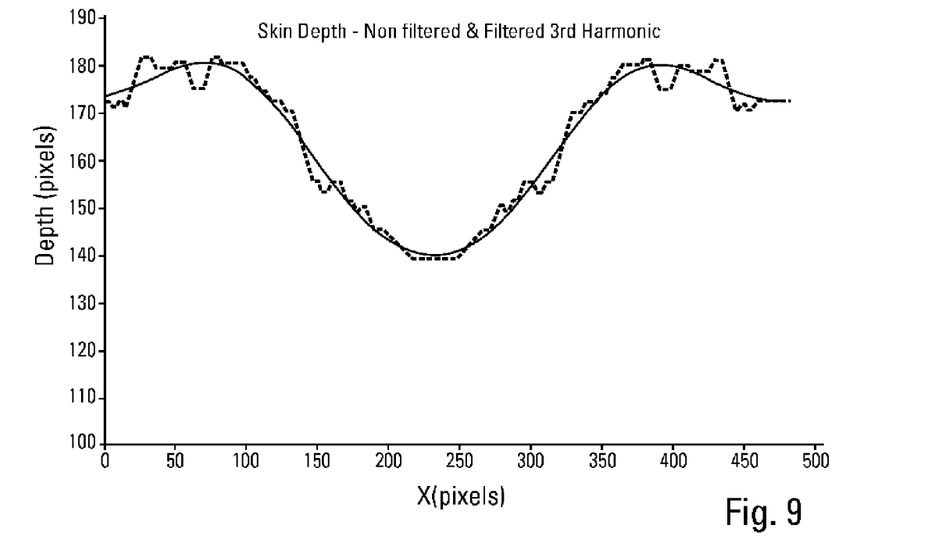
Figure 10:
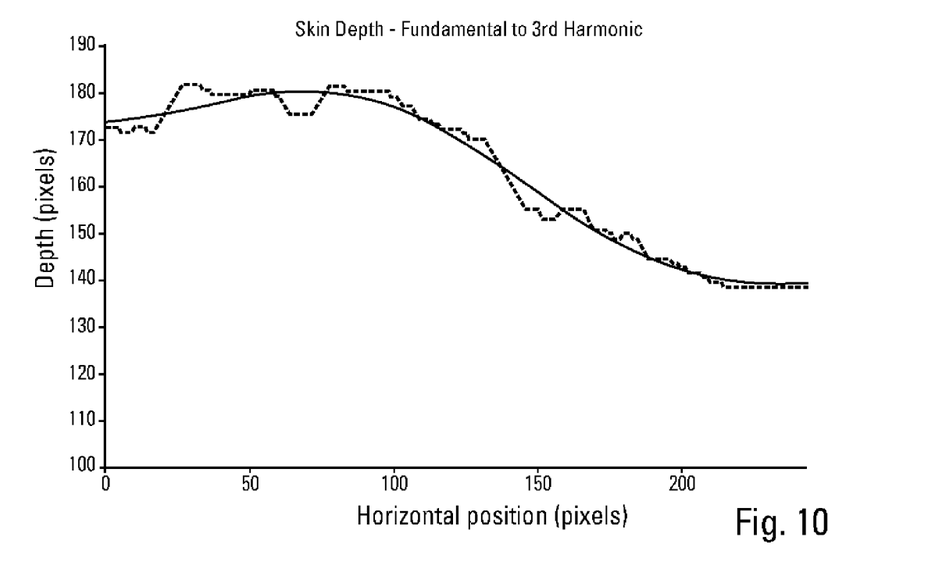
Figure 11:
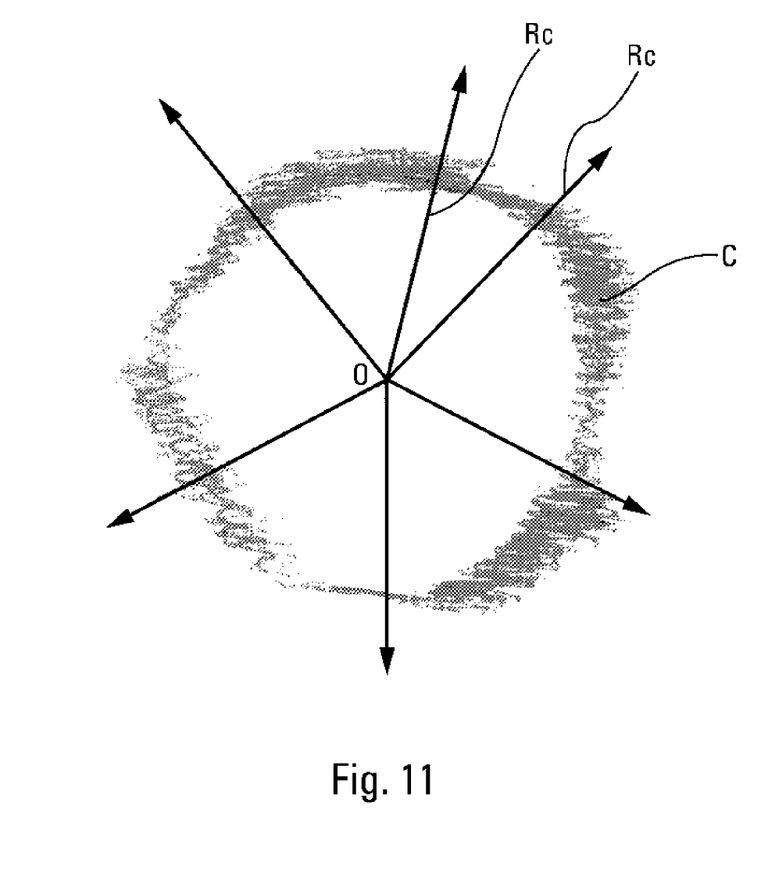
FIG. 11 is a greatly enlarged view of a carotid artery as seen in a sectional image used to explain another step of the tracing method of the invention.
Figure 12:
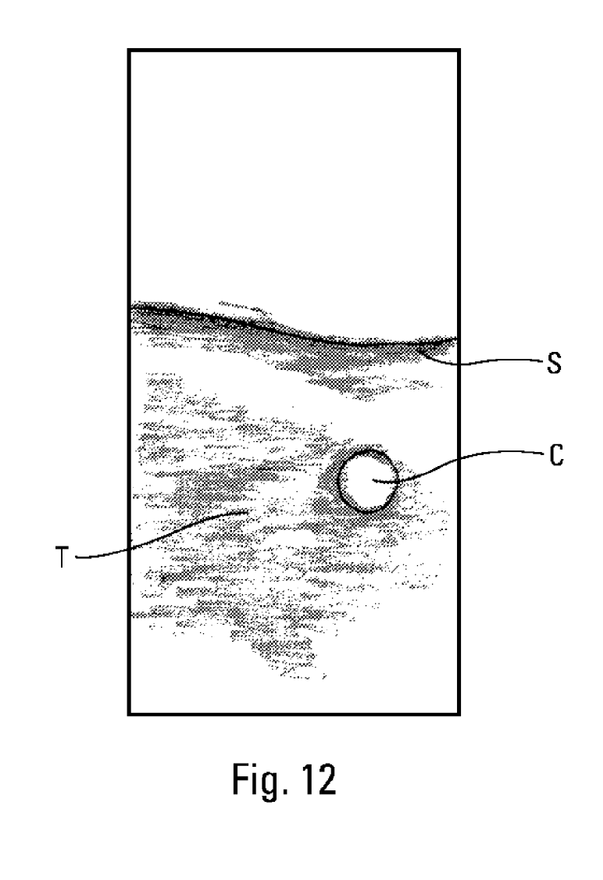
FIG. 12 is a diagram similar to FIGS. 3 and 5 showing the likely contours of the skin and the carotid artery determined using the tracing method of the invention traced on the sectional image and superimposed on the skin and the carotid artery, respectively.

The next step, which is optional, consists in smoothing this curve formed by a continuous path of pixels. To this end, the tracing method of the invention uses the filter properties of the Fourier transform. Given that the FIG. 7 curve is not periodic, it may be necessary to constitute a periodic curve by duplicating the curve with mirror symmetry and joining the two symmetrical curves, possibly with a small connecting segment. This is represented in FIG. 8. A curve covering a known period is obtained in this way. This periodic curve may then be filtered using a Fourier transform with a limited number of coefficients. A Fourier transform limited to the third harmonic is preferably used. This is represented in FIG. 9. A Fourier transform with higher harmonics does not make it possible to obtain perfect smoothing of the curve. This is why it is preferable to apply a limit of two or three harmonics. A perfectly smoothed periodic curve is obtained in this way. It then suffices to extract therefrom the curve segment that corresponds to the contour of the skin. This is represented in FIG. 10. A perfectly smooth curve that corresponds with a very high probability to the likely contour of the skin is obtained in this way. It suffices finally to trace this curve directly on the display screen superposed on the skin S. This is represented in FIG. 12.

The tracing method as described above may equally be applied to trace the likely contour of the carotid artery C, but this requires a preliminary step. Given that the carotid artery has a substantially annular contour, and more generally a closed loop shape, it is not possible to form directly columns K of pixels, given that each column would intersect the contour of the carotid artery at two points. This cannot be accepted, given that the tracing method of the invention aims to determine the pixel $P_x$ with the best score, and not two pixels with the best scores. Consequently, to be able nevertheless to use the tracing method as described above anyway, the present invention provides for forming or tracing radii from a point situated inside the carotid artery C. This is represented in a highly magnified and diagrammatic manner in FIG. 11. The contour of the carotid artery C is represented by a ring of non-uniform thickness. Radii Rc are traced from the center of the carotid artery. Nevertheless, it is not necessary to choose the absolute center of the carotid artery: any point inside the carotid artery C is satisfactory. To arrive at the column arrangement necessary for the tracing method of the invention, it then suffices to dispose all the radii Rc parallel and side by side like the teeth of a comb. The configuration is then the same as that of the columns K and all the steps of the tracing method may then be executed to determine the likely contour of the carotid artery. It should be noted that shaping the curve so as to be periodic is not necessary for the carotid artery, given that it forms a loop closed on itself. Finally, the likely contour of the carotid artery may be transferred onto the sectional image superimposed on the carotid artery, as may be seen in FIG. 12. A sectional image is thus made available in which the contours of the skin S and/or the carotid artery C are clearly defined.

This method of tracing the likely contour of an anatomical element is perfectly well suited to use in the method of monitoring movement of the target to be treated, as seen above. It may nevertheless be used in other circumstances in which it is necessary to define precisely the contour of an anatomical element visible on a sectional view of an anatomical site.

The invention claimed is:

1. A method of tracing the likely contour of an anatomical element in a sectional image of an anatomical site, the image being composed of pixels having different intensities, the contour of the anatomical element being represented by pixels of identical characteristic intensity and bordered by pixels of different intensities so as to identify the anatomical element visually in the sectional image without defining a contour of the anatomical element precisely, the method comprising the following steps:
   a) forming columns of pixels passing through the anatomical element;
   b) assigning each pixel a pixel score representing the probability of the pixel being situated on the contour of the anatomical element;
   c) constituting a matrix of pixel scores from a plurality of columns of pixels and defining numerous continuous paths of pixels, each passing through a single pixel of each column;
   d) assigning each continuous path a path score that is a function of the scores of the pixels constituting the continuous path;
   e) selecting from a set of continuous paths the path that has the best path score, that path representing the likely contour of the anatomical element,
   wherein the step c) further comprises the following steps:
      c1) identifying the pixel in the column that has the maximum score:
      c2) forming continuous segments of pixels;
      c3) identifying the longest continuous segment, this segment having a central pixel that is definitely situated on the contour of the anatomical element;
      c4) restricting the set of continuous paths to paths passing through the central pixel.

2. A tracing method according to claim 1, wherein the step b) comprises the following step:
   b1) establishing an intensity differential for each pixel between an averaged upper band of pixels and an averaged lower band of pixels situated on either side of the pixel concerned, this differential representing the pixel score.

3. A tracing method according to claim 1, further comprising, after the step e), a step of smoothing the continuous path representing the likely contour.

4. A tracing method according to claim 3, wherein the smoothing step consists of the following filtering steps:
   e1) if the continuous path from the step c) is not periodic, rendering it periodic to obtain a periodic curve;

e2) filtering the periodic curve to smooth it, retaining only the first harmonics of the Fourier series;

e3) extracting the smoothed continuous likely contour from the smoothed curve.

5. A tracing method according to claim 1 wherein the step a) comprises the following step if the contour of the anatomical element forms a closed loop:

a1) tracing radii from a point situated inside the closed loop, each radius crossing the contour of the anatomical element once;

a2) arranging the radii parallel and side by side to form columns of pixels.

6. A tracing method according to claim 1, wherein the steps d) and e) are effected simultaneously by means of a dynamic programming technique.

7. A method of monitoring movement of a target to be treated, notably by ultrasound, during its treatment, on the basis of a sectional image of an anatomical site representing the target, the method comprising the following steps:

capturing a reference image of the anatomical site before the movement;

choosing at least one anatomical marker visible on the reference image;

tracing the contour of the anatomical marker on the reference image, the image being composed of pixels having different intensities, the contour of the anatomical element being represented by pixels of identical characteristic intensity and bordered by pixels of different intensities so as to identify the anatomical element visually in the sectional image without defining a contour of the anatomical element precisely, the tracing comprising the following steps:

a) forming columns of pixels passing through the anatomical element;

b) assigning each pixel a pixel score representing the probability of the pixel being situated on the contour of the anatomical element;

c) constituting a matrix of pixel scores from a plurality of columns of pixels and defining numerous continuous paths of pixels, each passing through a single pixel of each column, wherein the step c) further comprises the following steps:

c1) identifying the pixel in the column that has the maximum score;

c2) forming continuous segments of pixels;

c3) identifying the longest continuous segment, this segment having a central pixel that is definitely situated on the contour of the anatomical element;

c4) restricting the set of continuous paths to paths passing through the central pixel;

d) assigning each continuous path a path score that is a function of the scores of the pixels constituting the continuous path;

e) selecting from the set of continuous paths the path that has the best path score, that path representing the likely contour of the anatomical element;

transferring the trace of the contour onto the sectional image of the anatomical site; and comparing the position of the anatomical site on the image with the position of the traced contour during treatment to detect unexpected movement of the target.

8. A method according to claim 7, comprising suspending the treatment of the target if an unexpected movement of the contour of the anatomical marker is detected from a reference image.

9. A method according to claim 7, comprising adjusting the treatment parameters as a function of the position of the marker.

10. A therapeutic treatment device comprising:

therapeutic treatment means for treating a target;

imaging means providing sectional images of an anatomical site comprising the target to be treated; and means for tracking movement of at least one anatomical marker visible in the sectional images;

the device being characterized in that the tracking means comprise means for tracing the contour of the anatomical marker on the sectional images to detect unexpected movement of the contour during treatment, the tracing means comprising software executing a tracing method, wherein each of the sectional images is composed of pixels having different intensities, the contour of the anatomical marker being represented by pixels of identical characteristic intensity and bordered by pixels of different intensities so as to identify the anatomical marker visually in the sectional image without defining a contour of the anatomical element precisely, the tracing method comprising:

a) forming columns of pixels passing through the anatomical marker;

b) assigning each pixel a pixel score representing the probability of the pixel being situated on the contour of the anatomical marker;

c) constituting a matrix of pixel scores from a plurality of columns of pixels and defining numerous continuous paths of pixels, each passing through a single pixel of each column, wherein the step c) further comprises the following steps:

c1) identifying the pixel in the column that has the maximum score;

c2) forming continuous segments of pixels;

c3) identifying the longest continuous segment, this segment having a central pixel that is definitely situated on the contour of the anatomical marker;

c4) restricting the set of continuous paths to paths passing through the central pixel;

d) assigning each continuous path a path score that is a function of the scores of the pixels constituting the continuous path; and e) selecting from the set of continuous paths the path that has the best path score, that path representing the likely contour of the anatomical marker.

11. A device according to claim 10, further comprising means for suspending treatment that are activated if the unexpected movement exceeds a predetermined limit.

* * * * *